March 17, 1953
C. S. LEE
2,631,481
INDEXING DEVICE
Filed May 25, 1948
3 Sheets-Sheet 3
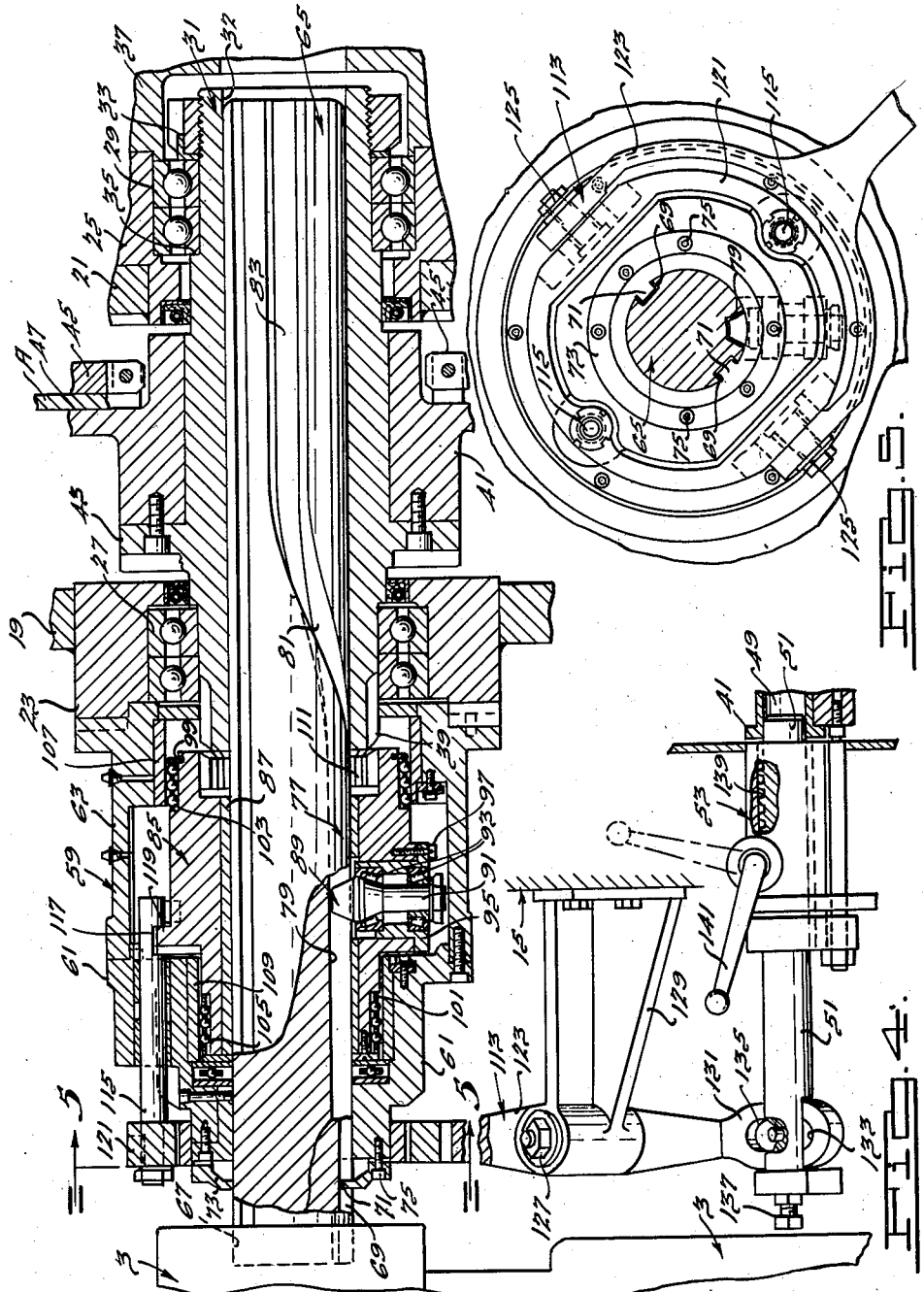
INVENTOR.
Chite S. Lee.
BY
Harness, Dickey & Pierce
ATTORNEYS.

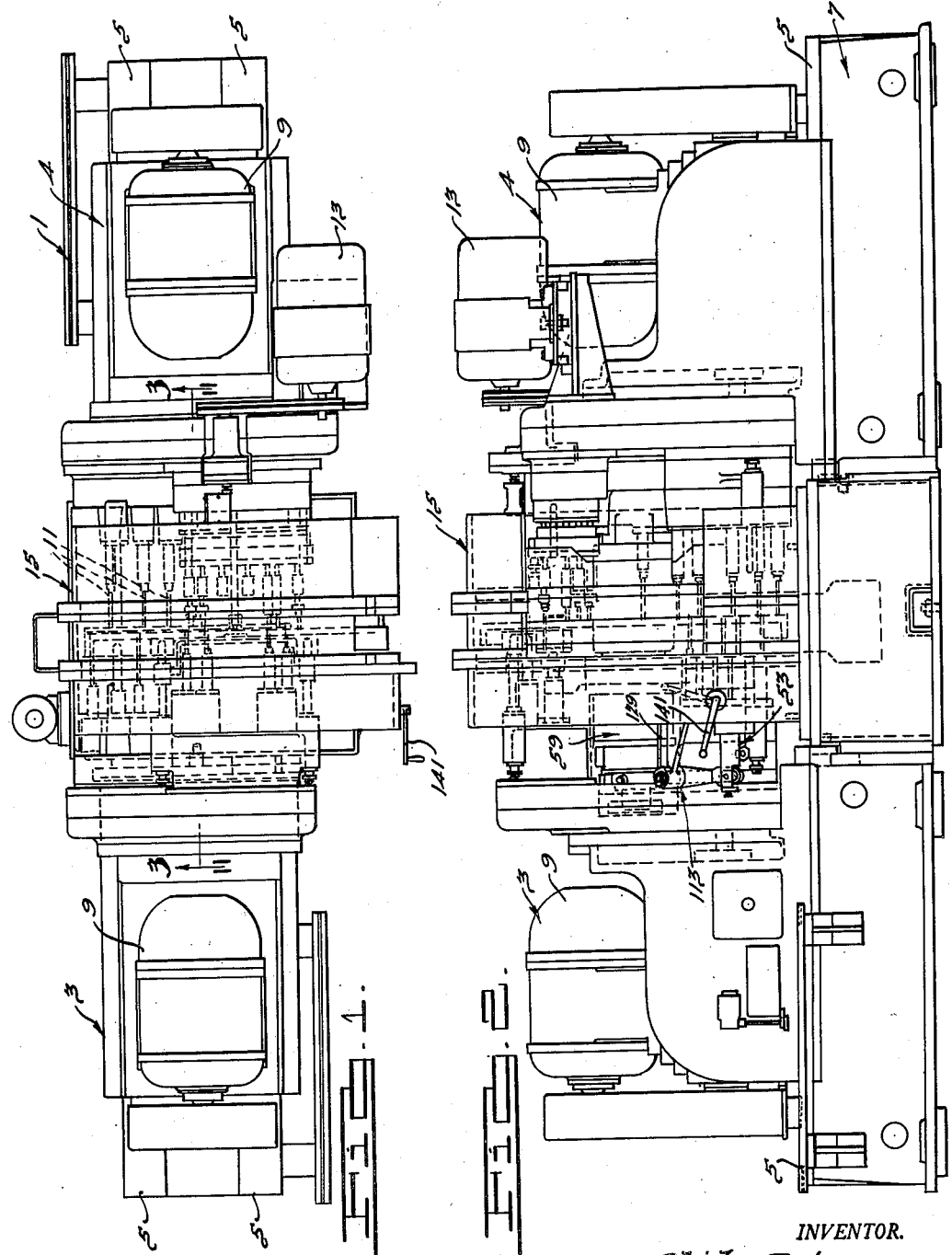

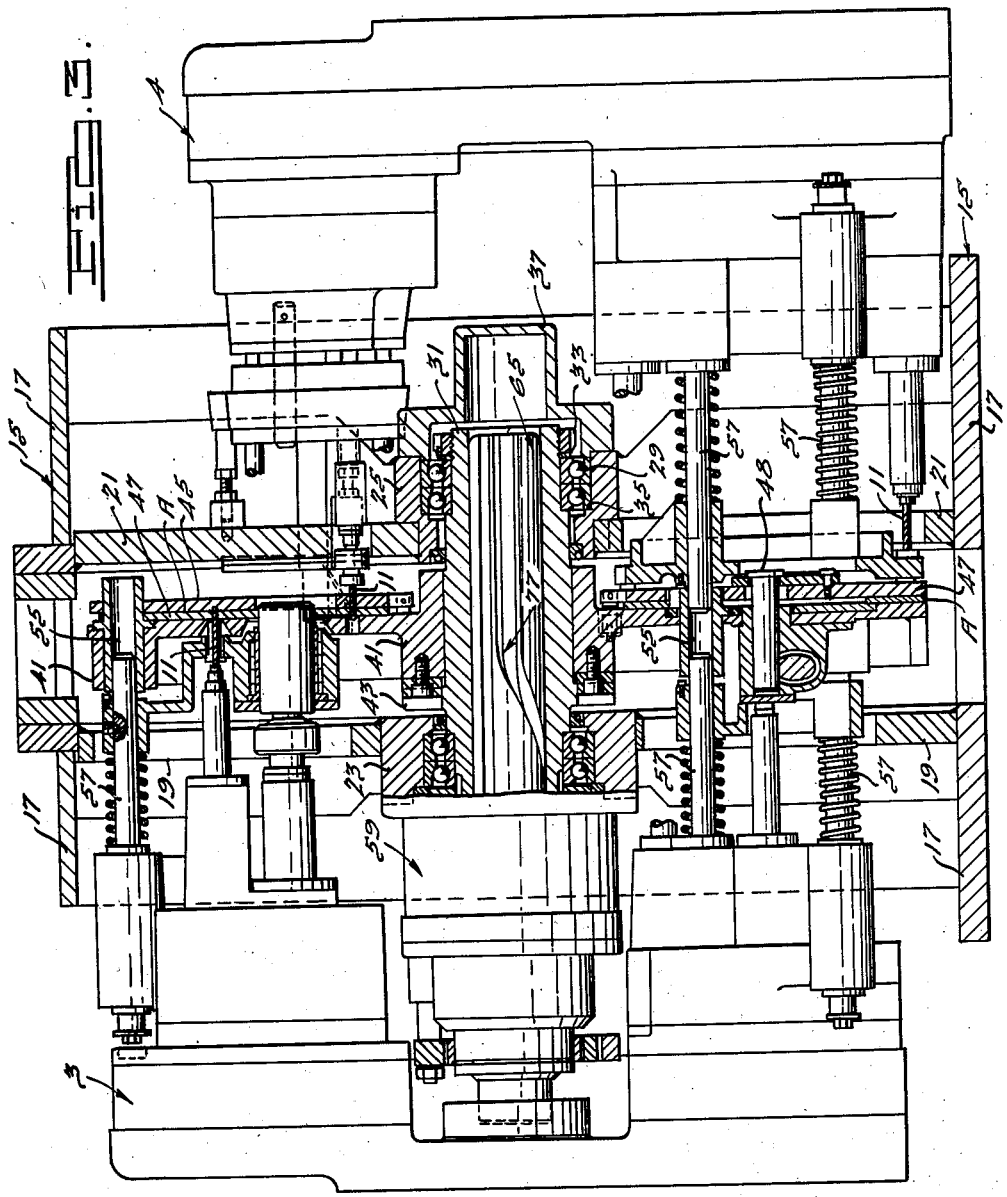

Patented Mar. 17, 1953

2,631,481

UNITED STATES PATENT OFFICE 2,631,481

INDEXING DEVICE

Chite S. Lee, Detroit, Mich.

Application May 25, 1948, Serial No. 29,100

11 Claims. (Cl. 77—64)

This invention relates to automatic machine tools and, in particular, refers to indexing devices therefor.

An object of the invention is to utilize traverse movement of a machine tool head for empowering indexing of an index or work-holding head.

Another object is to provide an indexing device which accurately positions a workpiece.

Another object is to provide an indexing device which is positively driven for only the required amount of index and thereafter is positively held against movement out of position.

Another object is to provide an indexing device in which the amount of movement is accurate and identical in successive indexes.

Another object is to provide an indexing device which is semiautomatic in operation.

In order to accomplish these and other objects, the present invention provides a connecting means between a movable part of the tool and the index head which is capable of transmitting force and movement from the tool to the head. In the most common applications, as in boring mills, for example, the movable part of the tool is a cutting tool-carrying head which moves to bring the cutting tool against the work and usually to feed the cutting tool. This movement is usually linear or reciprocating. In the most common cases, it is desired to have a rotary index head. Hence, in the illustrated embodiment of a preferred form of the invention, the connecting means hereinbefore referred to is capable of translating the linear movement of the tool head into rotary movement of index head. Preferably this connecting means includes a rotary clutch which is manually engageable with the head and automatically disconnected therefrom by engagement of a clutch actuator or fork and the movable tool head at the end of feed motion. In order to accurately produce and reproduce the desired degree of index, a cam and cam follower are utilized to connect the movable tool head to the rotary clutch. The cam is preferably a bar having a cam groove therein and the cam follower is disposed in the groove and depending from the clutch. The bar is capable of longitudinal or linear movement upon contact by the tool head so that the sides of the cam groove acting against the follower rotate the clutch and positively drive the head only the required amount. After the required index is obtained, the cam groove together with guide bars which engage the index head positively lock the follower and thus the head in the desired position. By proper design of the cam groove, various rates of index may be obtained. So also may various degrees of rotation or various numbers of stations be obtained.

A more detailed description of a preferred embodiment of the principles of the invention will be made in connection with the accompanying drawings, in which Figure 1 is a plan view of a boring machine embodying an indexing device in accordance with the present invention;

Figure 2 is a side elevation of a boring machine as shown in Figure 1 having the improved indexing device described herein;

Figure 3 is a vertical section taken approximately along the line 3—3 of Figure 1;

Figure 4 is a sectional view with parts removed and broken away of the improved indexing device; and Figure 5 is a view taken along the line 5—5 of Figure 4.

In the drawings, the improved index head is used with a horizontal boring mill 1 having opposed tool-carrying headers 3 and 4. From this application of the invention various other uses with other types of machines will be apparent to those skilled in the art.

In common fashion, the headers 3 and 4 are slidably mounted for longitudinal movement toward or away from each other on the ways 5 which are carried by the base structure 7 of the machine. This movement is empowered by motors 9. For the purpose of this application, movement of the headers toward the center of the machine, i. e., toward each other, will be referred to as "traverse movement," since its purpose is to place the drills adjacent the workpiece in proper position for the subsequent drilling, reaming, tapping or other operation. The headers 3 and 4 carry any desired number and size of longitudinally disposed drills or boring tools 11. Operative or cutting motion, while these tools drill, will be referred to herein as "feed motion" as distinct from the "traverse motion" hereinbefore mentioned. Rotation of the tools may be empowered by suitable means such as the motor 13.

A central annular frame 15 is fixedly connected to the base structure 7 and is disposed between the headers 3 and 4. As best recognized from Figure 3, the shell-like portions 17 of the frame 15 are of sufficient diameter to receive the headers 3 and 4. The frame 15 has spaced transverse partitions 19 and 21 which fixedly carry coaxial bearing housings 23 and 25 respectively, these housings being coaxial with the longitudinal axis of the machine. The housings 23 and 25 have bearings 27 and 29 respectively, and a hollow shaft or trunnion 31 is rotatably carried thereby. The right-hand end, i. e., end adjacent header 4, of the trunnion 31 has threaded thereon a suitable lock nut 33 to prevent longitudinal movement thereof to the left toward header 3. The trunnion 31 is also longitudinally fixed against movement toward header 4 as by an annular shoulder 35 thereon which abuts the inner end of the bearing 29. If desired, a cover 37 may be attached to the end of the housing 25 to encase the bearing 29 and end of trunnion 31. The other end of the trunnion 31 is splined as shown at 39 for a purpose to be hereinafter described.

The index head or plate 41 is disposed in the space between the partitions 19 and 21. It is suitably connected to the trunnion 31 for rotation therewith as by means of a central flange 43 on the trunnion to which it is bolted.

The index head is of any desired form and has any desired number of stations, this being dependent upon the nature of the machining to be performed. In the device shown, the head has four stations so that it is indexed ninety degrees between steps. The workpiece A may be suitably clamped to one face of the index head 41 by any suitable means. In the drawings, hinged covers 45 on the right-hand side 47 of the head are used for this purpose along with suitable clamping devices 48. The particular structure and design of the index head forms no part of this invention except that it preferably has a guide bore 49 in each station which is adapted to receive a guide pin 51 which forms a part of a manually operated switch 53 to be described hereinafter. In the device shown, the index head 41 has additional guide bores 55 which co-operate with guide bars 57 on each header 3 and 4 to fix the head in position during the actual machining operations. When the headers 3 and 4 are retracted, the guide bars 57 are thereby withdrawn from the bores 55 so that they do not interfere with indexing rotation of the head 41 and trunnion 31.

In order to encase and accommodate various other structures to be presently described, a longitudinally extending, annular housing 59, preferably made up of sections 61 and 63, is affixed to the left hand, or header 3 side, of the bearing housing 23.

Kinetic energy of the tool head 3 is preferably transmitted into rotation of the index head 41 by means of a cam bar 65. This bar is slidably mounted in the bore 32 of the hollow trunnion 31 and is arranged so that it reciprocates with the header 3. For this purpose it may be fixedly connected to the header 3 as shown at 67 or, if desired, it may be spring biased and in abutment relationship with the header 3. The bar 65 is nonrotatable, as indicated by its rigid connection 67; and as further means of accomplishing this, the bar may have longitudinal keyways 69 which are engaged by fixed keys 71 in the annular cover plate 73 which is rigidly connected to the stationary housing 59 as shown at 75.

The cam bar 65 has a longitudinal cam groove 77 therein which consists of a straight or linear portion 79 near the header 3, an intermediate curved portion 81, and a forward linear portion 83 within the trunnion 31. A clutch member 85, which may have an internal bushing sleeve 87, is rotatably and slidably mounted on the cam bar 65 and has a transverse cam follower 89 depending therefrom which rides inside the cam groove 77. The follower 89 and groove 77 may be tapered as best shown in Figure 5, and in order to reduce frictional wear on these elements, the follower preferably has a shaft 91 which is rotatably mounted in bearings 93 in a small carrier block 95 that is mounted in a side wall of the clutch 85 as shown at 97. Front and rear peripheral portions 99 and 101 of the clutch 85 are slidably and rotatably mounted in and with respect to the housing sections 63 and 61 by means of suitable bearings 103 and 105 inserted between them and bushings 107 and 109 in these housings respectively. The forward end of the clutch member 85 has a splined recess 111 which is adapted to rotatively engage the splined end 39 of the trunnion shaft 31.

It will be recognized that longitudinal movement of the cam bar 65 will rotate the clutch member 85. This occurs because the depending cam follower 89 rides in the groove 77 and will be forced to follow the curved portion 81 thereof around the periphery of the bar 65.

Longitudinal movement of the clutch 85 into and out of engagement with the trunnion 31 may be actuated by suitable means 113 such as shown in Figures 4 and 5. This may include a pair of diametrically opposite longitudinal rods 115 having notches 117 therein which engage the rim of a flange 119 formed on the outer periphery of the clutch member 85. Longitudinal movement of the rods 115 thus slides the clutch relative to the housing 59 and bar 65 but rotation of the clutch is not impeded by the notches 117. The rods 115 are preferably carried by a transverse annular plate 121 which fits over the bar 65 at the rear of the housing 59. The plate 121 is pivotally connected along a diameter at right angles to that through the rods 115 to a fork or yoke 123 as shown at 125. The yoke 123 is substantially transverse to the cam bar 65 and is pivotally connected near its midsection, as shown at 127, to a bracket 129 that is affixed to the stationary frame 15. By means of this structure, movement of the end 131 of yoke 123 to the right, toward the index plate 41, slides the clutch 85 to the left and out of engagement with trunnion 31, while movement of the yoke end 131 to the left toward the head 3 moves the clutch 85 into engagement with the trunnion 31.

Right-hand movement of the yoke end 131 is preferably actuated by the tool head 3 and left-hand movement is preferably manually actuated. For this purpose the guide pin 51, hereinbefore described, may be pivotally connected to the yoke end 131 in an elongated slot 133 therein by means of a suitable pin 135. The pin 51 preferably extends beyond the yoke end 131 and has there an adjustable length abutment screw 137. This screw is adapted to be contacted by the head 3 of the machine tool and its length is adjusted so that at the end of feed motion the head 3 forces the pin 51 into the guide bore 49 in the index head 41 and also pushes the yoke end 131 far enough to the right to disengage the clutch 85 and trunnion 31. A rack 139 is formed on the upper surface of the pin 51 and this is engaged by a gear (not shown) which is rotated by the handle 141 which is pivotally mounted in the housing of switch 53, this switch being fixed to frame 15. Manual movement of the handle 141 to the position shown in dotted lines in Figure 4 moves the pin 51 out of the bore 49 to release the index head 41 and at the same time forces the yoke end 131 to the left to engage the clutch 85 with the trunnion 31.

In connection with the operation of the structure heretofore described, Figures 3 and 4 show the relative positions of the various parts at the end of feed motion wherein the tools 11 extend through the workpiece A. In this position the head 3 has abutted the screw 137 and forced the stop pin 51 into the guide bore 49 in the index head 41, and it has also moved the yoke 123 about its pivot point 127 so as to disengage the clutch 85 from the trunnion 31 and thus the head 41.

In order to remove the workpiece A it is necessary to retract the heads 3 and 4 to withdraw the tools. This is done by properly actuating the motors 9 in any conventional manner. As the heads withdraw, the head 3 carries with it the cam bar 65. This draws the curved portion 81 of the cam groove 77 by the follower 89, but since the clutch 85 is disengaged it rotates idly on the bar 65. The index head 41 is held in fixed rotary position by the stop pin 51 of the switch 53 as the bar 65 and the guide bars 57 are withdrawn.

During the preceding operation the handle 141 is in the full-line position of Figure 4; but when it is completed, the operator throws the handle forward to the dotted-line position. This removes the stop pin 51 from the index head 41 which is then free to rotate with the trunnion 31. This also drives the yoke end 131 to the rear to force the clutch 85 forward so that the trunnion splines 39 rotatably engage the splined clutch recess 111. At or just before this point the heads 3 and 4 may be actuated to begin traverse movement along the index head. As the head 3 begins this movement the cam follower 89 rides in the linear portion 83 of the cam slot 77 so that there is no camming action thereon to rotate the clutch. As the head 3 approaches closer to the index head 41, however, the curved portion 81 imparts a peripheral or tangential component of force to the cam follower 89 which rotates it and the connected trunnion 31 and index head 41 through the same arc as is included between the parallel straight portions 79 and 83 on either side of the curved cam groove 81. This rotation indexes the head 41 and brings the newly positioned workpiece A in alignment with certain of the tools 11 and another workpiece into an unloading position so that the operator can unload and load during the drilling operation, by manually operating the clamping means 48 and cover 45. As the head 3 moves on in its traverse motion, the straight groove 79 goes by the cam follower 89 with no effect thereon. During this movement the guide bars 57 enter the guide bores 55 in the index head 41 and before the tools engage the work A so that the index head is fixedly positioned at this time by the guide bars as well as by the straight cam groove 79. In an intermediate portion of the groove section 79, traverse motion ends and feed motion begins as the tools 11 enter the workpieces. At or before the end of feed motion the head 3 abuts the screw 137 to drive the stop pin 51 forward into the bore 49 in the head 41 and to disengage the clutch 85 by moving it to the position shown in Figure 4. When drilling is completed, the heads 3 and 4 may then be retracted as described above.

It will be realized that the length and slope of the curved portion 81 of the cam groove 77 determines the amount and speed of index of the head 41 and that these can be of any desired values. It is thus possible by regulating the shape of the groove 77 to control motion of the head so that it may have rapid acceleration and slow deceleration therefore minimizing vibration and chatter. In the construction illustrated, the curved groove 81 covers an arc of 90°; hence the index head has four stations, one of which is for loading and unloading.

It will also be realized that by means of structure embodying the principles illustrated in the embodiment just described, it is possible to utilize traverse motion of the tool heads 3 and 4 to index the index head 41; further, that this index movement is positive and accurate and capable of identical reproduction because of the cam bar 65 and clutch follower 65 arrangement. An important advantage of the machine from the standpoint of large scale production is that it saves time since indexing and traversing occur simultaneously whereas in the devices now known these occur at separate intervals. A further advantage is that the indexing mechanism is located at the center of the machine thus making it more compact than conventional devices wherein apparatus performing this function is on the periphery of the index head.

Other advantages, modifications and applications of the invention will be apparent to those skilled in the art.

I claim:

1. An indexing device for machine tools comprising a movable index head, mechanism for rotatively driving said index head including a cam follower, and coactive clutch elements one connected to the index head and the other connected to said cam follower, and a cam affixed to the machine tool for movement therewith coactive with said cam follower to index said head by movement of the tool.

2. In a machine-tool setup, the combination of an index head rotatable in a plane normal to the direction of feed of the tool, a cam follower adapted to rotatively engage the head, a cam bar fixed to the machine tool for movement therewith, said bar having a cam groove and said follower extending into said groove whereby movement of the bar in the direction of feed rotates the head a predetermined amount, and clutch means interposed between and operatively connected to the cam follower and to said index head for selectively connecting and disconnecting the same.

3. An indexing device for machine tools comprising a rotatable index head capable of carrying a workpiece, a rotary clutch member capable of rotative connection to the head, manual means for engaging said clutch and head, automatic means for disengaging said clutch and said head, and cam means including a follower connected to the clutch and a non-rotatable cam for operatively connecting the tool to the clutch to translate linear traverse movement of the tool into rotary movement of the clutch.

4. An indexing device for machine tools comprising a rotatable index head capable of carrying a workpiece, a rotary clutch member capable of rotative connection to the head, manually operated means for engaging the clutch and head, means actuated by a tool in its final feed motion for disengaging the clutch and head, a cam follower connected to the clutch member for rotating the same, and a cam bar having a cam groove operably engaged by the cam follower and being capable of linear movement under the influence of the tool so as to rotate the follower and clutch.

5. An indexing device for machine tools comprising a rotatable index head capable of carrying a workpiece, a rotary clutch member capable of rotative connection to the head, first means manually operable to engage the clutch and head, second means capable of actuation by a tool in its final feed motion to disengage the clutch and head, stop means engageable with the head for holding it in fixed rotary position, said stop means being engaged by the second means and disengaged by the first means, and cam means rotatively connected to the clutch and capable of actuation by movement of the tool for rotating said clutch a predetermined amount.

6. An indexing device for machine tools comprising a longitudinally slidable cam bar adapted to be moved by abutment with a machine tool during traverse and feed motion thereof, an index head rotatably mounted on said cam bar, a clutch member rotatably mounted on said cam bar and adapted to rotatively engage the head, said bar having a longitudinally disposed curved cam groove therein, a cam follower depending from said clutch disposed in said groove whereby longitudinal motion of the bar rotates the clutch a predetermined amount, a clutch fork connected at one end to the clutch for engaging and disengaging the clutch and head, said clutch fork being pivotally mounted between its ends, a stop pin engageable with the head to fix the rotary position thereof, first means connecting the lower end of the fork to the pin so that when the pin engages the head the fork disengages the clutch and vice versa, and manual means for moving the pin out of engagement with the head, said first means being constructed and arranged so that it is abutted by the tool in the final feed movement to engage the pin and disengage the head.

7. The invention as claimed in claim 4 wherein the cam follower is conical and the cam groove is tapered on approximately the angle of the cone.

8. An indexing device for machine tools of the type having a reciprocable part comprising a rotatable index head, lock means selectively engageable with the head to hold the same against rotation, means for rotatively driving said head including a cam bar fixed to said reciprocable part and having a cam groove, a cam follower mounted to travel in said groove, a clutch having coactive clutch elements one connected to the head and the other connected to said cam follower, and means for simultaneously actuating said lock means and said clutch.

9. An indexing device for machine tools of the type having a reciprocable part comprising a rotatable index head, a bolt element slidable into and out of engagement with said head and operative to hold the same against rotation, means for rotatively driving said head including a cam bar fixed to said reciprocable part and having a cam groove, a cam follower mounted to travel in said groove, a clutch having coactive clutch elements one connected to the head and the other connected to said cam follower, manual means for engaging said clutch elements and simultaneously disengaging said bolt from the index head, and automatic means for disengaging said clutch elements and simultaneously engaging said bolts with said index head.

10. An indexing device for machine tools of the type having a reciprocable part comprising a rotatable work-carrying index head, a slidable bolt element selectively engageable with the head to hold the same against rotation, means for rotatively driving said head including a cam bar fixed to said reciprocable part and having a cam groove, a cam follower mounted to travel in said groove, a clutch having coactive clutch elements one connected to the head and the other connected to said cam follower, a mechanism connected to said clutch and to said bolt element for simultaneously actuating said clutch and said bolt element, said mechanism including an adjustable stop engageable by said reciprocating part and operable thereby to engage said bolt with the index head and simultaneously to disengage said clutch, said mechanism also including a manually actuatable handle permitting operation of the mechanism to engage said clutch and simultaneously to disengage the bolt from said index head.

11. An indexing device for machine tools of the type having a reciprocable tool-carrying slide comprising a rotatable work-carrying index head, guide bars carried by the slide engageable with the index head before engagement of the tools with the work to hold said head rotatively fixed, a slidable bolt element selectively engageable with the head and operable jointly with said guide bars to hold the head against rotation, means for rotatively driving said head including a cam bar fixed to said slide and having a cam groove, a cam follower mounted to travel in said groove, a clutch having coactive clutch elements one connected to the head and the other connected to said cam follower, and mechanism connected to said clutch and to said bolt element operative by said slide at the limit of its travel in one direction to disengage said clutch and simultaneously to engage said bolt element with said index head and a manual actuator coactive with said mechanism to engage said clutch and simultaneously to disengage said bolt element from said index head.

CHITE S. LEE.

REFERENCES CITED

The following references are of record in the file of this patent:

UNITED STATES PATENTS

| Number | Name | Date |
| --- | --- | --- |
| 1,398,226 | Fretter | Nov. 29, 1921 |
| 1,918,538 | Hallenbeck | July 18, 1933 |
| 2,346,352 | Boxell | Apr. 11, 1944 |